US012764685B2

(12) United States Patent
Cheng et al.

(10) Patent No.: US 12,764,685 B2
(45) Date of Patent: Oct. 13, 2026

(54) SIGNAL TRANSMISSION OVER UNLICENSED SPECTRUM

(71) Applicant: MediaTek Singapore Pte. Ltd., Singapore (SG)

(72) Inventors: Jun-Qiang Cheng, Beijing (CN); Tao Chen, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 390 days.

(21) Appl. No.: 18/386,660

(22) Filed: Nov. 3, 2023

(65) Prior Publication Data

US 2024/0155520 A1 May 9, 2024

(30) Foreign Application Priority Data

Nov. 7, 2022 (WO) ................ PCT/CN2022/130295
Oct. 30, 2023 (CN) ......................... 202311421181.0

(51) Int. Cl.
*H04W 56/00* (2009.01)
*H04W 72/0453* (2023.01)

(52) U.S. Cl.
CPC ... *H04W 56/0015* (2013.01); *H04W 72/0453* (2013.01)

(58) Field of Classification Search
CPC .......... H04W 56/0015; H04W 72/0453; H04L 5/0041; H04L 5/0064; H04L 5/005; H04L 5/0044
See application file for complete search history.

(56) References Cited

U.S. PATENT DOCUMENTS

2025/0056434 A1* 2/2025 Li ..................... H04W 72/0453

OTHER PUBLICATIONS

European Patent Office, “Search Report”, Apr. 10, 2024, Germany.
3GPP TSG-RAN WG1 Meeting #110bis-e, R1-2208449 e-Meeting, Oct. 10-19, 2022, Huawei, HiSilicon, Physical channel design for sidelink operation over unlicensed.
3GPP TSG RAN WG1 #109-e, R1-2204248, e-Meeting, May 9-20, 2022, Apple, On Physical Channel Design Framework for Sidelink on FR1 Unlicensed Spectrum.
3GPP TSG-RAN WG1 Meeting #109-e, R1-2203983 e-Meeting, May 9-20, 2022, Physical channel designs of NR sidelink in unlicensed channel, OPPO.
3GPP TSG RAN WG1 #110, R1-2206401, Toulouse, France, Aug. 22-26, 2022, CATT, Gohigh, Discussion on physical channel design framework for sidelink on unlicensed spectrum.

* cited by examiner

*Primary Examiner* — Vinncelas Louis
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE obtains a number (N) of transmissions of a sidelink synchronization signal block (S-SSB) with repetitions in a frequency domain. The UE obtains a gap in the frequency domain between two adjacent transmissions of the N transmissions. The UE maps the N S-SSBs into N sets of resources in which two adjacent sets are separated by the gap. The N sets of resources overlap in time domain. The UE performs the N transmissions of the S-SSB using the N sets of resources.

11 Claims, 10 Drawing Sheets

SIGNAL TRANSMISSION OVER UNLICENSED SPECTRUM

CROSS-REFERENCE TO RELATED APPLICATION(S)

This application claims the benefits of PCT Application Number PCT/CN2022/130295, entitled "METHODS OF SIGNAL TRANSMISSION OVER UNLICENSED SPECTRUM" and filed on Nov. 7, 2022, which is expressly incorporated by reference herein in its entirety.

BACKGROUND

Field

The present disclosure relates generally to communication systems, and more particularly, to techniques of signal transmission over unlicensed spectrum.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE obtains a number (N) of transmissions of a sidelink synchronization signal block (S-SSB) with repetitions in a frequency domain. The UE obtains a gap in the frequency domain between two adjacent transmissions of the N transmissions. The UE maps the N S-SSBs into N sets of resources in which two adjacent sets are separated by the gap. The N sets of resources overlap in time domain. The UE performs the N transmissions of the S-SSB using the N sets of resources.

In another aspect of the disclosure, a method, a computer-readable medium, and an apparatus are provided. The apparatus may be a UE. The UE determines a configuration of one or more sub-channels on a frequency band. Each sub-channel comprises one or more interlaces mapped to resource blocks (RBs) within the frequency band. The UE selects at least one sub-channel of the one or more sub-channels for carrying packet. The UE transmits the packet on RBs of the at least one sub-channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
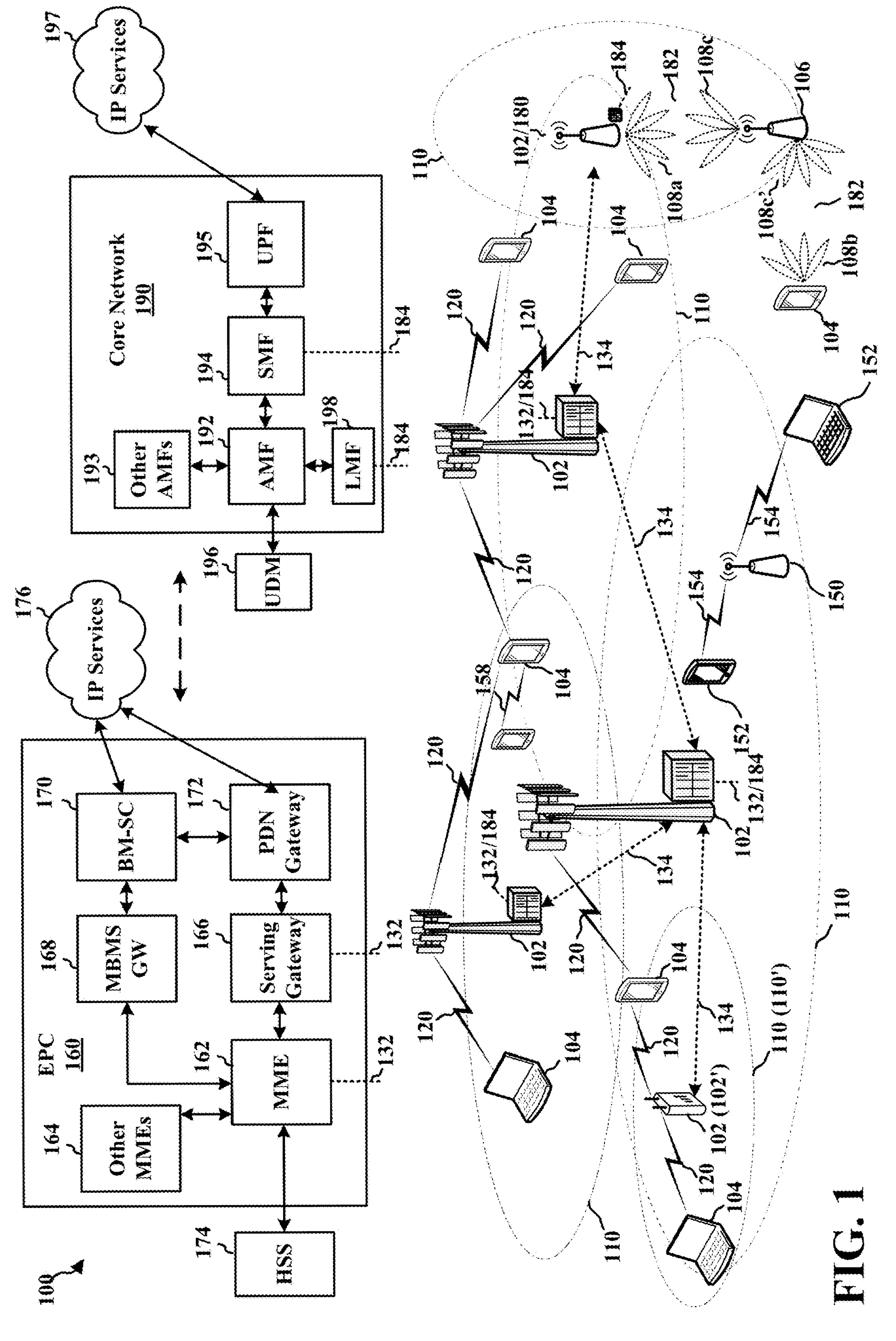
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
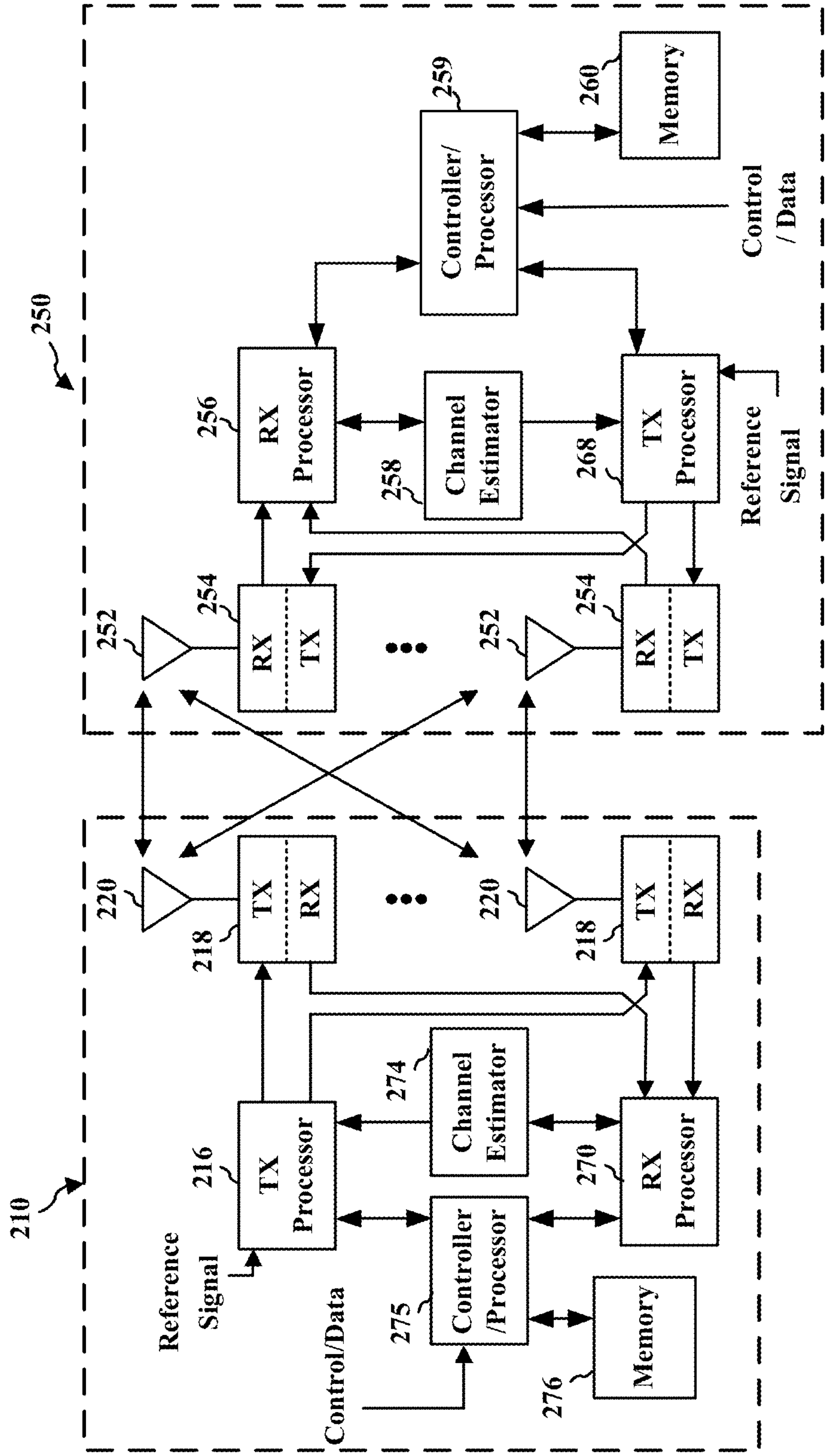
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
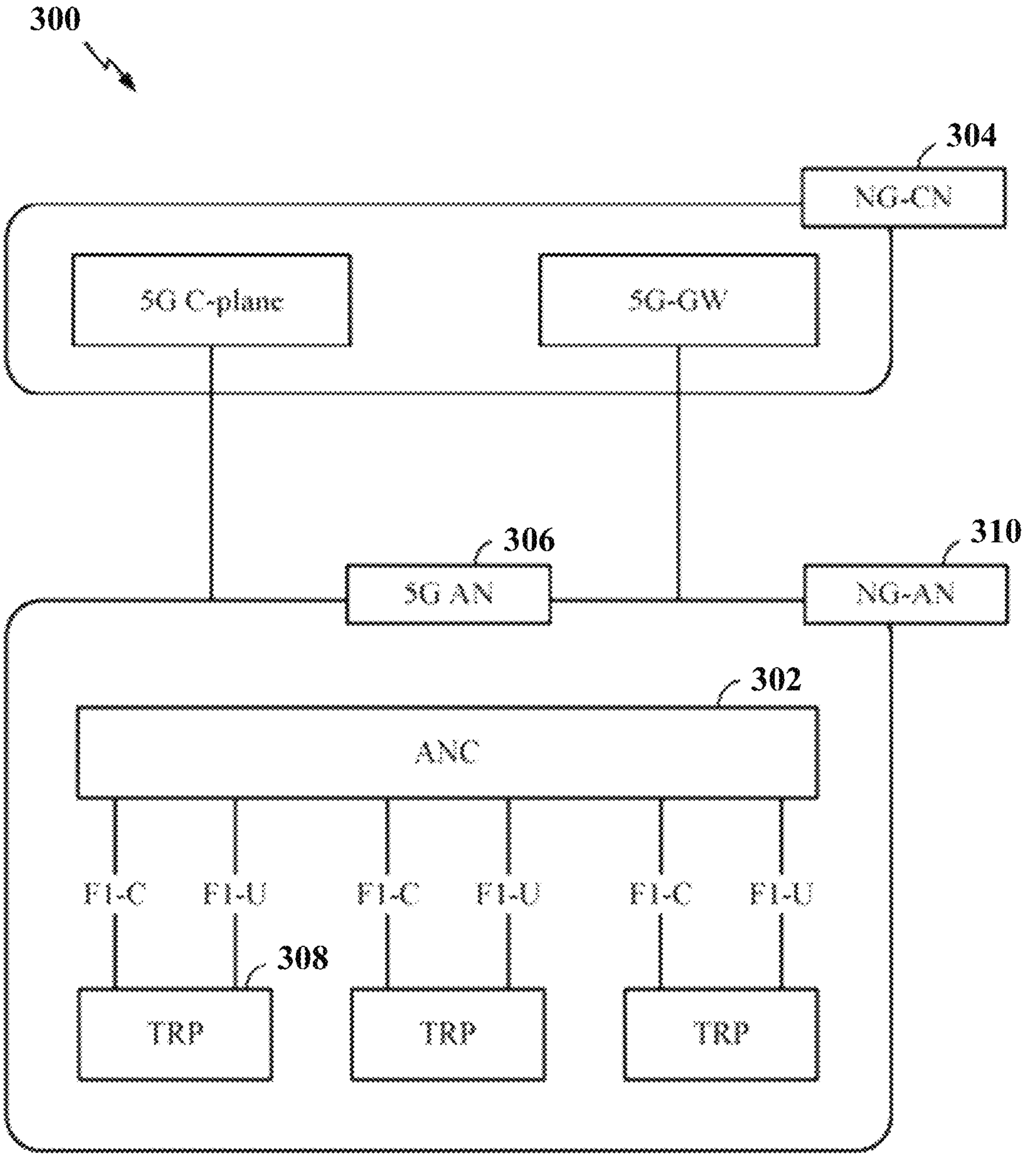
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with “cell.”

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
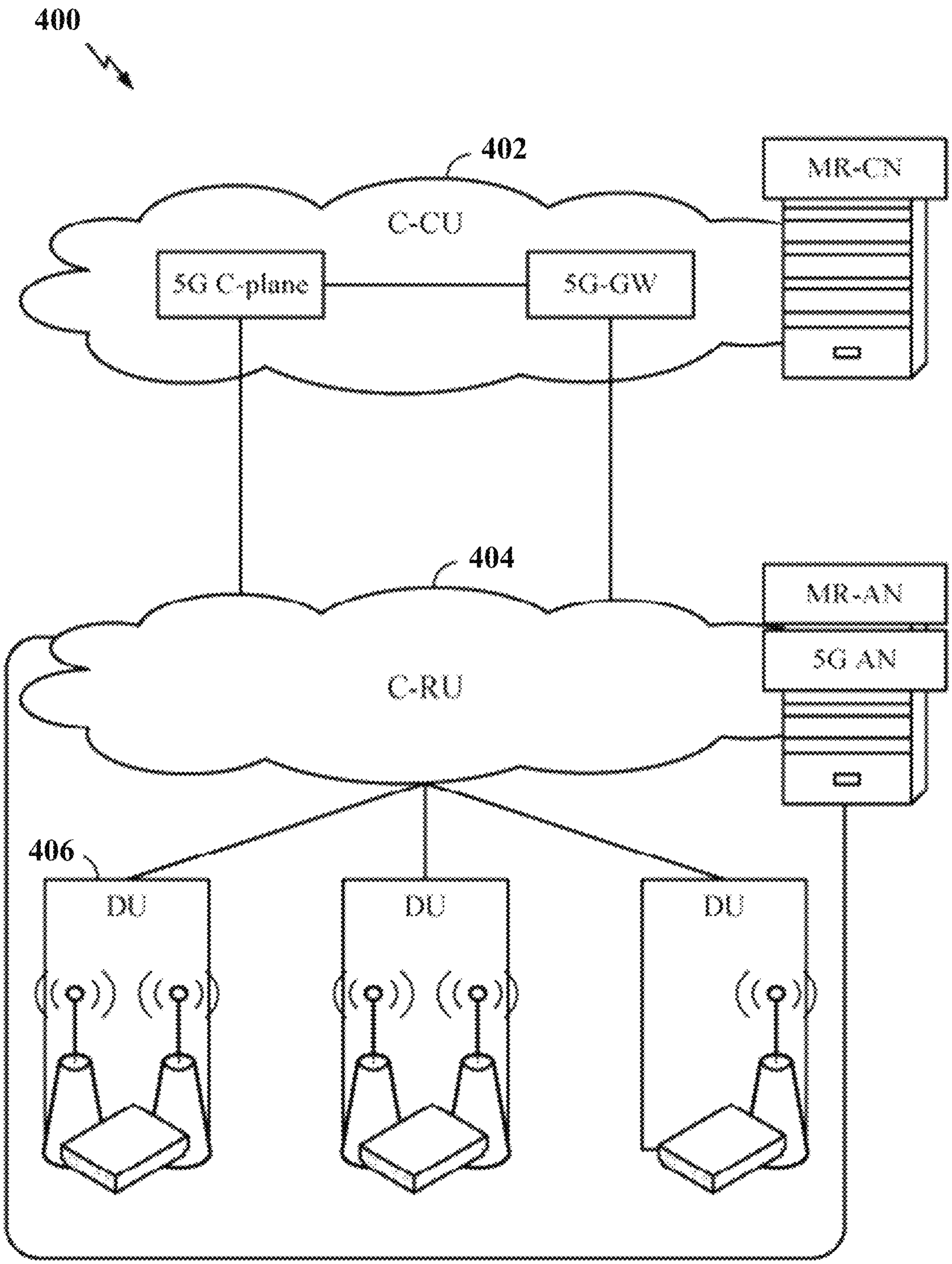
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
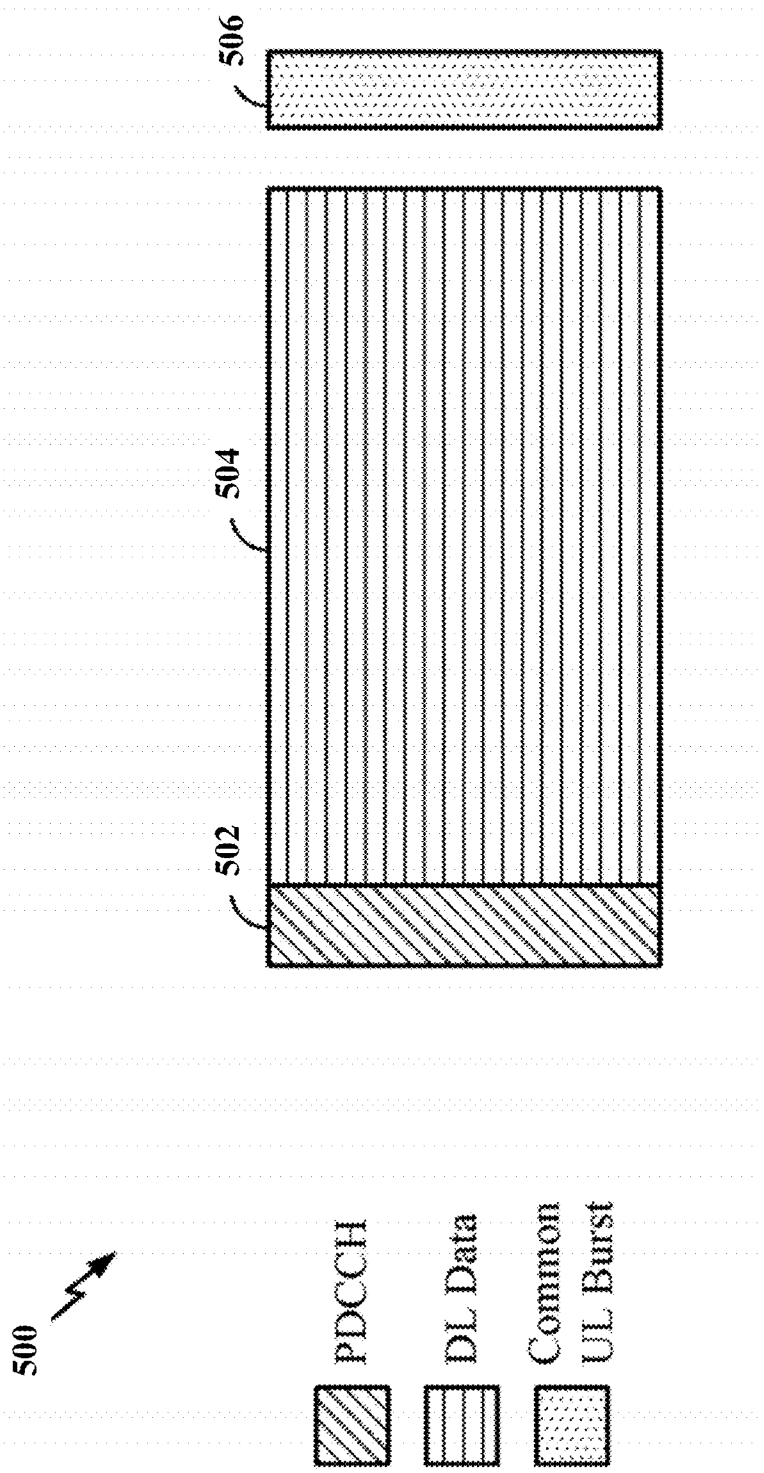
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
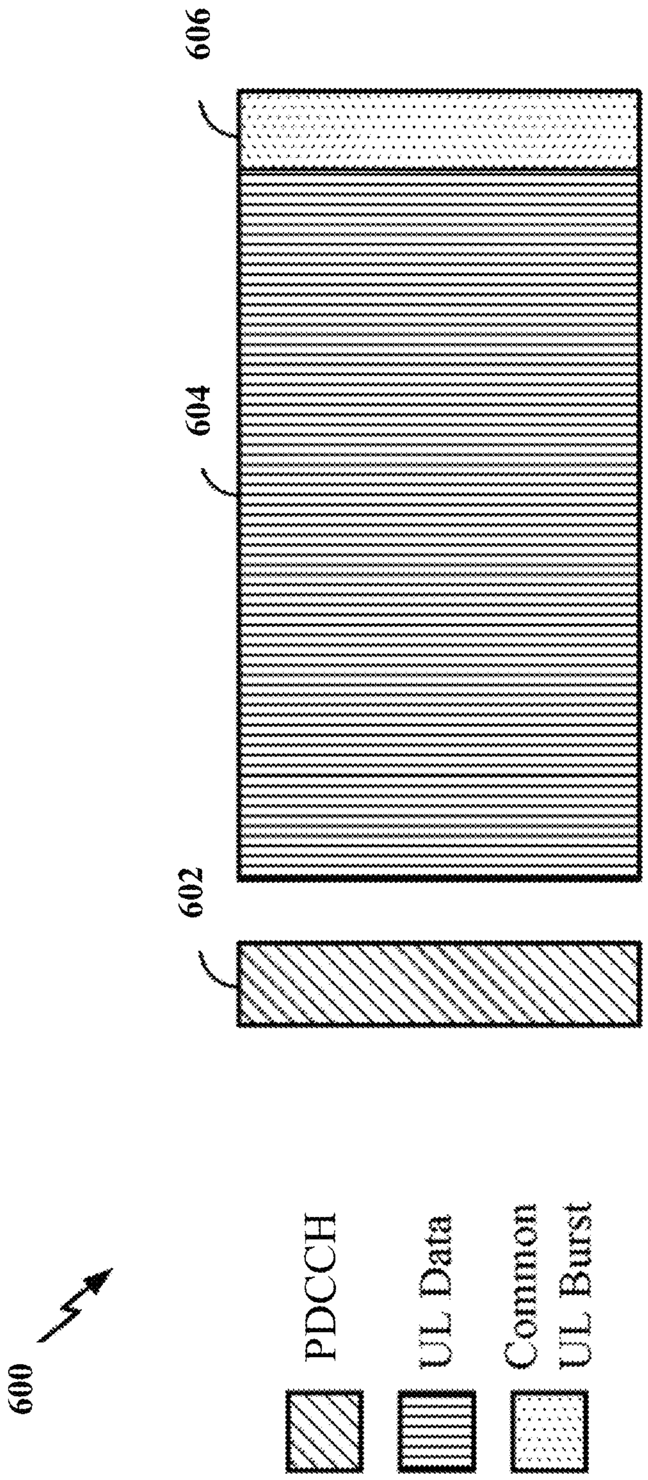
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

OCB (occupied channel bandwidth) is a regulatory requirement for transmitting in unlicensed spectrum in some regions. If a 20 MHz LBT (Listen Before Talk) channel is occupied, the transmission needs to occupy at least 80% of the 20 MHz channel bandwidth. This ensures efficient usage of the unlicensed channel. OCB is calculated based on the lowest and highest subcarriers occupied within the channel. The gap between transmissions is not counted towards OCB. There is also a temporary exemption of the OCB requirement that allows minimum 2 MHz occupied bandwidth, but it is not recommended to rely on this exemption.

For sidelink (SL) transmissions over unlicensed spectrum (SL over unlicensed spectrum, abbreviated as SL-U), considering that the SL synchronization signal (S-SSB, i.e., Special Subframe Configuration) only occupies 11 resource blocks (RBs) in the frequency domain, it cannot meet the OCB requirement and/or temporary exemption of OCB requirement for unlicensed spectrum. This issue needs to be addressed.

This disclosure relates to SL-U (Sidelink over unlicensed spectrum), and proposes methods and designs for S-SSB (Sidelink Synchronization Signal Block) transmission in SL-U to meet the OCB (Occupied Channel Bandwidth) requirements and/or temporary exemption of OCB requirements for unlicensed spectrum.

Specifically, on a sidelink (SL), according to the (pre-) configuration, all or part of the RBs/REs of S-SSB including S-PSS (Primary Synchronization Signal), S-SSS (Secondary Synchronization Signal) and PSBCH (Physical Sidelink Broadcast Channel) can be repeated in the frequency domain, with or without a gap.

In addition, for the case where multiple starting symbols are (pre-)configured within one slot, this invention also proposes a method to repeat the transmission of the first N symbols of the full slot transport block (TB) in other starting symbols.

This disclosure also relates to the design of PSCCH (Physical Sidelink Control Channel) and PSSCH (Physical Sidelink Shared Channel) channel structure for SL. For example, proposing the method of interleaved sub-channel indexing, designing the frequency domain resource identifier based on IRB for PSSCH transmission, and the resource allocation method across different RB sets when multiple RB sets are used for transmission. For UE (User Equipment) supporting different bandwidths, PSCCH resources can be located in one RB set corresponding to PSSCH and/or in each RB set.

In certain configurations, the UE can also be called a terminal, a mobile station (MS), etc. For example, the UE can also be a mobile phone or a computer with a mobile terminal. The UE can also be a portable, pocket-sized, handheld, built-in mobile device in a computer, or a vehicle-mounted mobile device, which exchanges voice and/or data with the radio access network.

In certain configurations, all and/or part/subset of the RBs/REs of S-PSS/S-SSS/PSBCH can be repeated in the frequency domain with and/or without gap via (pre-)configuration according to the occupied channel bandwidth and/or subcarrier spacing, in order to meet the OCB requirements of S-SSB transmission (which may also include temporary exemption of OCB).

Figure 7:
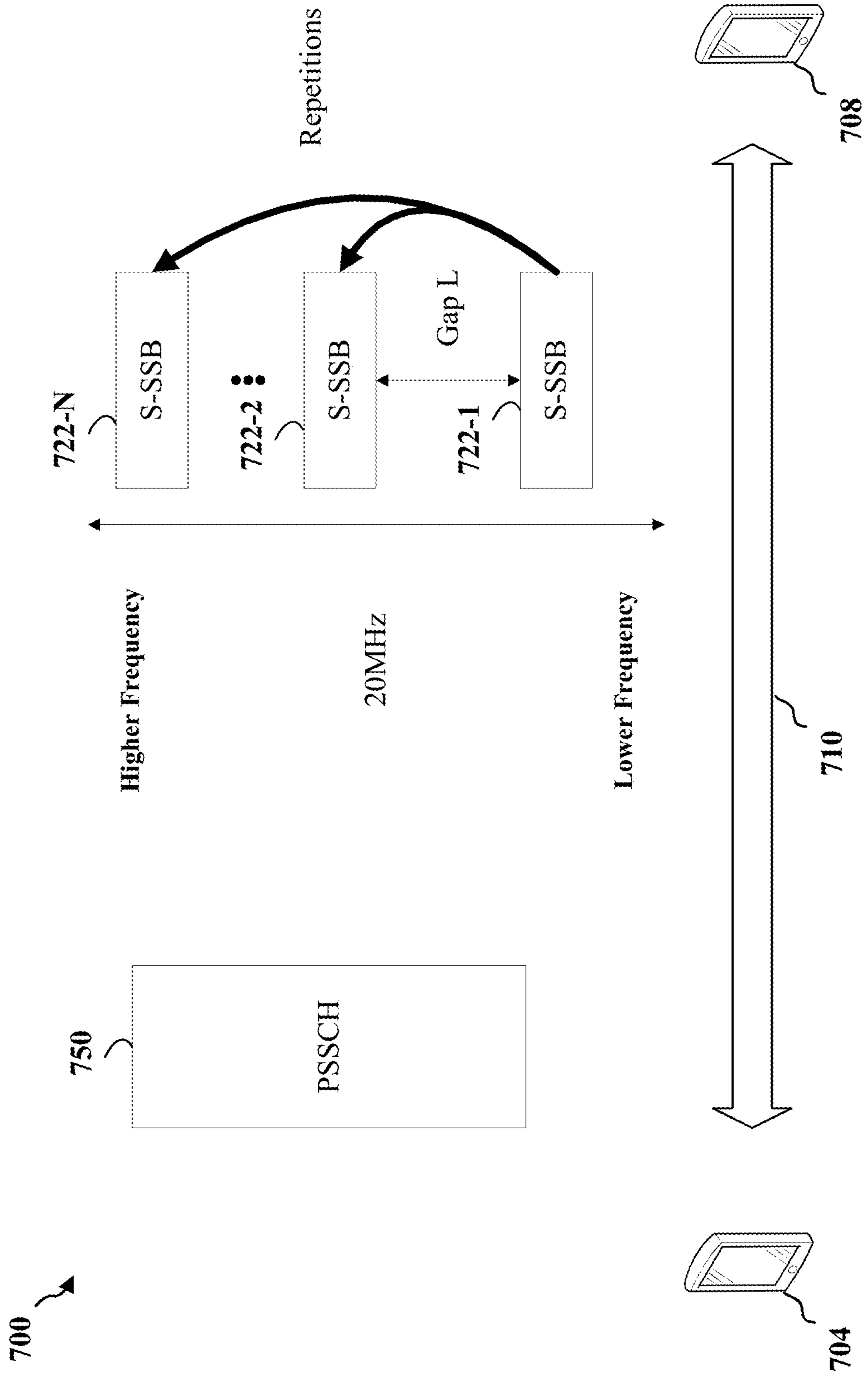
FIG. 7 is a diagram illustrating SSB transmissions with repetition in frequency domain.

FIG. 7 is a diagram 700 illustrating SSB transmissions with repetition in frequency domain. A UE 704 communicates with a UE 708 and/or other wireless devices on a sidelink 710 on an unlicensed spectrum. The UE 704 is configured to transmit SSBs 722-1, 722-2, . . . , 722-N simultaneously at different frequency locations on a frequency band. In this example, the frequency band has a bandwidth of 20 MHz.

Each of the SSBs 722-1, 722-2, . . . , 722-N are a copy of the same SSB. Therefore, the transmissions of the SSBs 722-1, 722-2, . . . , 722-N may be considered as transmissions of the SSB in repetition in frequency domain. The SSB may contain one or more of S-PSS/S-SSS/PSBCH.

The UE 704 may be (pre-)configured with the number of transmissions N and the gap L between two adjacent transmissions for transmitting the SSBs 722-1, 722-2, . . . , 722-N. The number of transmissions N indicates the number of S-SSB repetitions, and the gap L indicates the gap in frequency domain between adjacent S-SSBs. Using the SSBs 722-1, 722-2 as an example, this gap generally refers to the gap in the frequency domain between the highest subcarrier occupied by the SSB 722-1 and the lowest subcarrier occupied by the SSB 722-2.

The gap is in units of PRB (Physical Resource Block) or RB. For consecutive S-SSB repetitions, the gap is 0, and for non-consecutive S-SSB repetitions, the gap is greater than 0. Table 1 below shows an example of potential values of N and corresponding minimum/maximum gaps for different SCS with S-SSB repetition within one RB set under a channel bandwidth (BW) of 20 MHz. Here, the LBT channel refers to the Listen Before Talk channel.

Table 1 shows potential values of N and corresponding min/max gap for different SCS regarding S-SSB repetition within one RB set.

TABLE 1

| SCS (kHz) | 80% of LBT channel (PRB) | N | Minimum gap (PRB) | Maximum gap (PRB) |
|---|---|---|---|---|
| 15 | 88.89 | 2 | 67 | 84 |
| | | 3 | 28 | 36 |
| | | 4 | 15 | 20 |
| | | 5 | 9 | 12 |
| | | 6 | 5 | 8 |
| | | 7 | 2 | 4 |
| | | 8 | 1 | 2 |
| | | 9 | 0 | 0 |
| 30 | 44.44 | 2 | 23 | 29 |
| | | 3 | 6 | 9 |
| | | 4 | 1 | 2 |
| 60 | 22.22 | 2 | 1 | 2 |

For a given SCS, Table 1 shows the number of PRBs constituting 80% of a reference 20 MHz LBT channel bandwidth, which is the minimum occupied bandwidth required to meet OCB. For example, for 15 kHz SCS, 80% of 20 MHz is 88.89 PRBs.

Then for different values of N (number of S-SSB transmissions/repetitions), the table shows the minimum and maximum gap in PRBs between the repetitions in frequency domain, such that the total occupied bandwidth by the repeated S-SSBs meets the 80% OCB requirement.

For instance, with 15 kHz SCS and N=2 transmissions, the gap needs to be between 67-84 PRBs, because with 2 transmissions of 11 PRB S-SSB and a minimum gap of 67 PRBs, the total minimum occupied bandwidth will be 11+11+67=89 PRBs, meeting the 80% requirement of 88.89 PRBs.

With 15 kHz SCS and N=9 transmissions, the gap is 0 PRB. Each S-SSB occupies 11 PRBs. Total occupied bandwidth is 9*11 PRBs=99 PRBs. This meets the 80% OCB requirement of 88.89 PRBs with 15 kHz SCS and 20 MHz channel bandwidth.

With 30 kHz SCS and N=2 transmissions, the gap needs to be between 23-29 PRBs. Each S-SSB occupies 5 PRBs. With a minimum gap of 23 PRBs between repetitions, the minimum total occupied bandwidth is 5+23+5=33 PRBs, meeting the 80% requirement of 44.44 PRBs.

Even though Table 1 only shows N starting from 2, the number of transmissions N is generally configurable from 1 to 9. N=1 means only a single S-SSB transmission, with no repetition. This would apply in cases where there is a temporary exemption from the occupied channel bandwidth (OCB) requirements.

For example, some regions may provide a temporary exemption that the minimum occupied bandwidth can be 2 MHz instead of 80% of the LBT channel bandwidth (e.g. 16 MHz for a 20 MHz channel). In such a case, a single legacy S-SSB transmission occupies around 2 MHz, so it can meet the temporary 2 MHz exemption even without any repetition (N=1).

Therefore, although Table 1 focuses on S-SSB repetition to meet the normal 80% OCB requirements, the number of transmissions N can also be set to 1 in cases where a temporary OCB exemption allows for no repetition.

All related parameters, including: the position of the first S-SSB (e.g., starting point), the gap between two adjacent S-SSBs, the number of S-SSB repetitions, etc., can be (pre-)configured at the UE 704 and the UE 708. Further, the parameters may be signaled to the UE 704 and the UE 708 from a base station. Further more, the UE 704, after obtaining the parameters, may signal the parameters to the UE 708. The parameters can be carried on at least one of RRC (Radio Resource Control), MAC-CE (Medium Access Control-Control Element), the first SCI (Sidelink Control Information) and the second SCI, etc.

An RB set refers to a contiguous set of resource blocks (RBs) in the frequency domain. For example, in a 20 MHz system bandwidth with 15 kHz subcarrier spacing, there are a total of 100 RBs. This may be divided into two RB sets of 50 RBs each, with an intra-cell guard band in between. The S-SSBs are transmitted within an RB set.

The gap and number of transmissions N are configured per RB set. This allows different configurations in different RB sets if desired. The gap between repeated S-SSBs can be pre-configured per RB set, selected from the range of 0 to 84 PRBs. A gap of 0 PRBs indicates consecutive S-SSB transmissions with no gap. A gap greater than 0 PRBs indicates non-consecutive S-SSB transmissions with a gap in between. The number of S-SSB transmissions N can also be pre-configured per RB set, selected from the range of 2 to 9 transmissions.

The gap and N configurations allow flexibility in adjusting the S-SSB transmissions to meet the occupied channel bandwidth requirements for different subcarrier spacings and channel bandwidths.

For a UE that supports NR sidelink communication in unlicensed spectrum (NR SL-U), the UE may indicate, by signaling, this capability of transmitting S-SSB repetitions within one RB set.

By signaling this capability, the UE indicates to the network that it is capable of transmitting repeated S-SSBs within an RB set on the sidelink in unlicensed spectrum.

The network can then configure the UE accordingly if it wants the UE to transmit repeated S-SSBs to meet the occupied channel bandwidth requirements.

The UE 708 detects the multiple SSB instances at different frequencies and obtain the timing/frequency synchronization information of the UE 704. This timing and frequency synchronization allows UE 708 to achieve alignment with UE 704's transmission timing and frequency on the sidelink. With this alignment to UE 704's sidelink timing/frequency, UE 708 can now transmit and receive data on the sidelink to/from UE 704 at the expected time instants and frequencies. In this example, the UE 704 subsequently transmits a PSSCH 750 to the UE 708.

Figure 8:
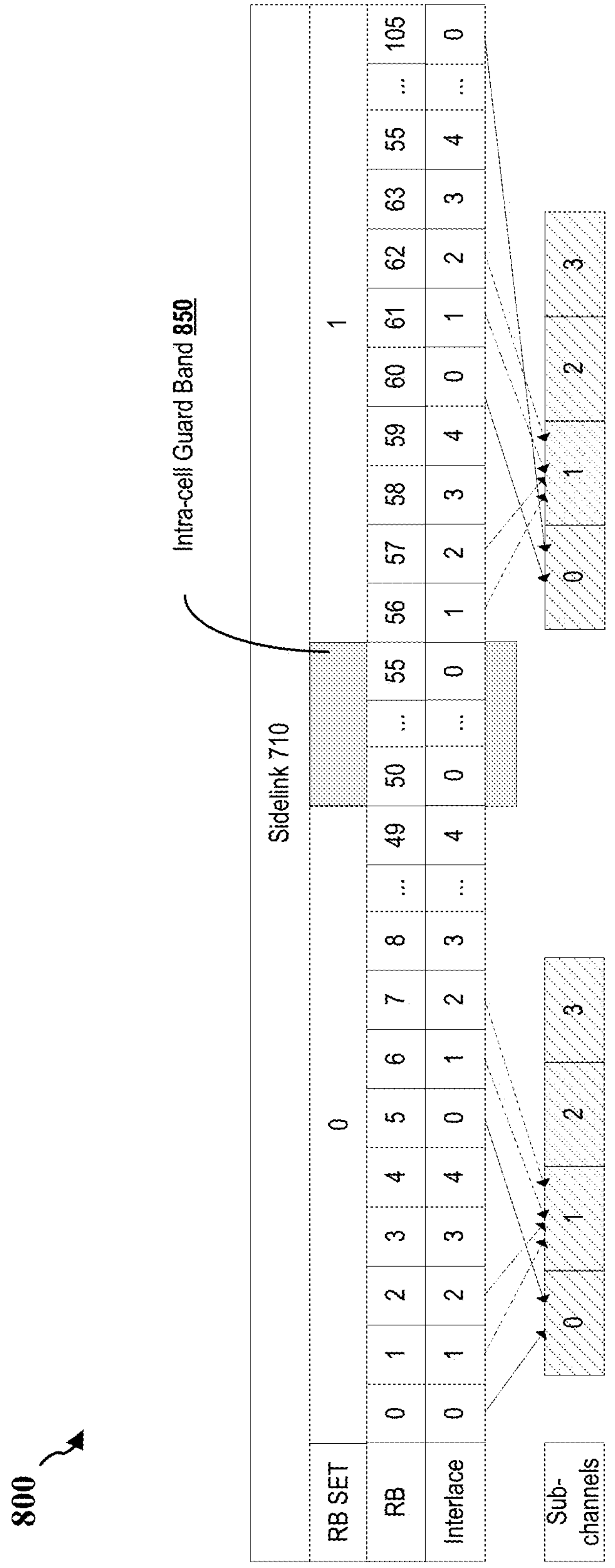
FIG. 8 is a diagram illustrating an interlace resource block (IRB) based transmission.

FIG. 8 is a diagram 800 illustrating an interlace resource block (IRB) based transmission. IRB is a technique used for PSCCH/PSSCH transmission in sidelink to meet the occupied channel bandwidth (OCB) requirements in unlicensed spectrum. It spaces out the resource blocks used for transmission in an interlaced manner across the channel bandwidth. This allows the transmission to occupy a wider bandwidth compared to using adjacent RBs. By occupying more bandwidth, it helps meet the OCB requirements in unlicensed spectrum.

As described supra, the frequency resources of the sidelink 710 may be divided into one or more RB sets. In frequency domain, the RBs in one RB sets can be allocated to one or more sub-channels. In certain configurations, the PSSCH 750 may be mapped to one sub-channel.

A sub-channel is a unit for frequency domain resource allocation within an RB set. It provides more granular allocation than directly using the full RB set. A sub-channel can be defined as K interlaces within an RB set for interlaced RB based transmission. An interlace refers to RBs mapped in a periodic pattern across the RB set. K is a configurable parameter. For example, K=2 means a sub-channel contains 2 interlaces. The sub-channels are indexed within an RB set, such as 0, 1, 2, etc. The same indexes repeat periodically across different RB sets. One sub-channel can be the minimum unit for frequency domain resource allocation, called the allocation granularity. SL-U supports interlaced RB based transmission, while using one sub-channel as the frequency domain RA granularity.

The frequency resources of the sidelink 710 is divided into two RB sets 0 and 1. Each RB set includes multiple RBs. For example, if the sidelink 710 is 20 MHz with 15 kHz subcarrier spacing, the sidelink 710 may contain a total of 106 RBs. The sidelink 710 may be divided into two RB sets of 50 RBs each, with an intra-cell guard band 850 containing 6 RBs in between.

The interlaces are mapped to the RBs in a periodic pattern. In this example, the RBs of the sidelink 710 are mapped to 5 interlaces numbered #0 to #4. In particular, the interlace #0 is mapped to every 5th RB starting from RB #0, the interlace #1 is mapped to every 5th RB starting from RB #1, and so on. This mapping repeats across the 50 RBs in each RB set. As such, interlace #0 includes RB #0, RB #5, RB #10, etc. Interlace #1 includes RB #1, RB #6, RB #11, etc. Interlace #2 includes RB #2, RB #7, RB #12, etc. Interlace #3 includes RB #3, RB #8, RB #13, etc. Interlace #4 includes RB #4, RB #9, RB #14, etc.

Further, K interlace(s) may be mapped to one sub-channel. In this example, RB set #0 includes sub-channels #0-1. One interlace, in particular interlace #0, is mapped into the sub-channel #0. Two interlaces, in particular interlaces #0 and #1, are mapped into the sub-channel #2.

A sub-channel is defined within 1 RB set. That is, the sub-channels are first defined within a single RB set. For example, in RB set 0, there may be sub-channels 0, 1, 2, 3, etc. The sub-channels are numbered or indexed within each RB set. For example, in RB set 0, the sub-channels are indexed as 0, 1, 2, 3, etc. The sub-channel indexes are periodic across RB sets. That is, if there are multiple RB sets in the resource pool, the sub-channel indexes repeat periodically in each RB set.

When the UE 704 transmits data on the sidelink 710, a sub-channel is used as the smallest unit (granularity) for frequency resource allocation. In this example, the sidelink 710 bandwidth is 20 MHz which contains 106 RBs. These 106 RBs are grouped into 5 interlaces numbered 0 to 4 based on the 15 kHz subcarrier spacing used. These 5 interlaces are further divided into 4 sub-channels numbered 0 to 3. The sub-channels are defined on top of the underlying interlace structure of the sidelink 710. This provides the framework that the sub-channels are mapped to. For instance, sub-channel 0 may be mapped to interlace 0.

When UE 704 needs to allocate frequency resources on the sidelink 710 to transmit data, it will allocate in terms of sub-channels rather than individual RBs or interlaces. For example, UE 704 may decide to allocate sub-channel 0 or 1 for a transmission instead of selecting particular RBs across different interlaces.

Figure 9:
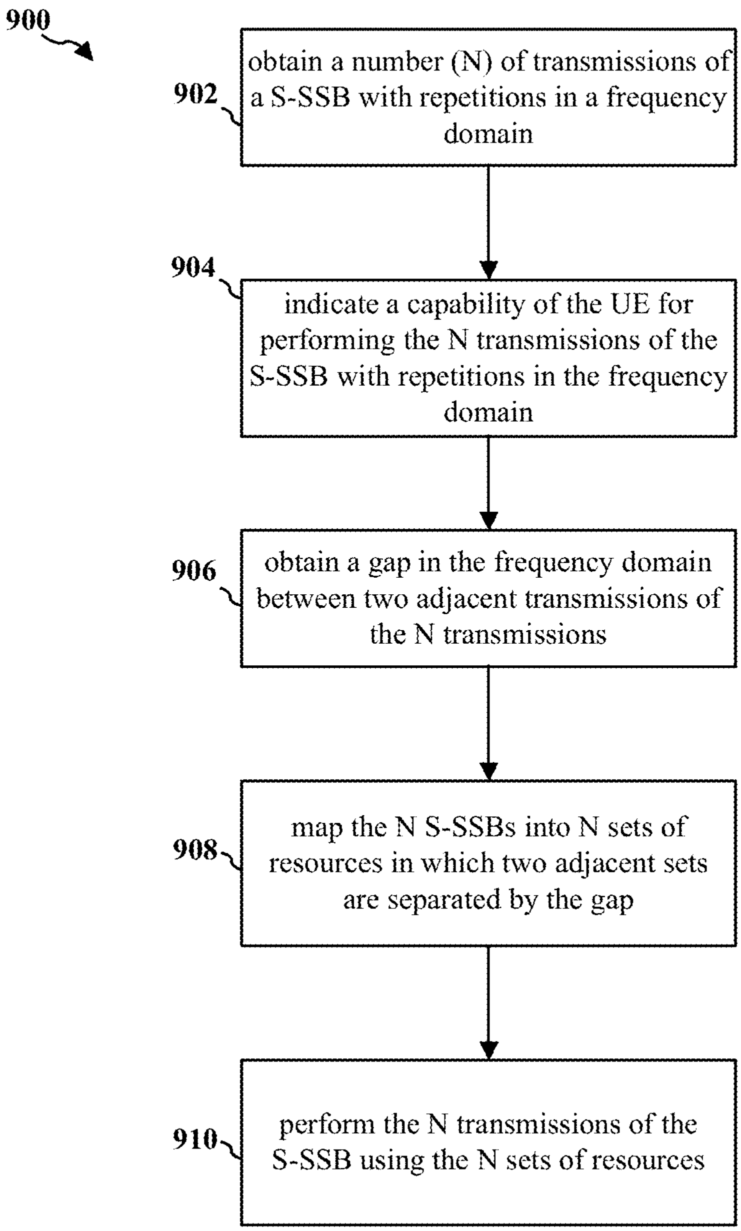
FIG. 9 is a flow chart of a method (process) for transmitting SSBs.

FIG. 9 is a flow chart 900 of a method (process) for transmitting SSBs. The method may be performed by a UE (e.g., the UE 704, the UE 250). In operation 902, the UE obtains a number (N) of transmissions of a sidelink synchronization signal block (S-SSB) with repetitions in a frequency domain. In operation 904, the UE indicates a capability of the UE for performing the N transmissions of the S-SSB with repetitions in the frequency domain. In operation 906, the UE obtains a gap in the frequency domain between two adjacent transmissions of the N transmissions. In operation 908, the UE maps the N S-SSBs into N sets of resources in which two adjacent sets are separated by the gap. The N sets of resources overlap in time domain. In operation 910, the UE performs the N transmissions of the S-SSB using the N sets of resources.

In certain configurations, at least one of the number (N) and the gap is preconfigured at the UE per resource block (RB) set. In certain configurations, the gap is between a lowest subcarrier of a Physical Sidelink Broadcast Channel (PSBCH) in the upper S-SSB and a highest subcarrier of the PSBCH in the lower S-SSB of any two adjacent S-SSB transmissions of the N S-SSB transmissions.

In certain configurations, an occupied channel bandwidth from a lowest subcarrier of the N sets of resources to a highest subcarrier of the N sets of resources occupies at least a threshold portion of a bandwidth of a frequency band utilized by the UE. The frequency band may be on a sidelink. In certain configurations, the bandwidth of the frequency band is 20 MHz and a subcarrier spacing of the frequency band is 15 or 30 or 60 KHz, wherein the number (N) is in a range from 2 to 9 and the gap is in a range from 0 to 84 physical resource blocks (PRBs). In certain configurations, an occupied channel bandwidth from a lowest subcarrier of the N sets of resources to a highest subcarrier of the N sets of resources occupies at least a threshold bandwidth of a frequency band utilized by the UE. N may be 1 and the threshold bandwidth may be 2 MHz.

In certain configurations, the S-SSB has a number of corresponding additional candidate S-SSB occasions in different time slots with a pre-configured gap between any two adjacent candidate S-SSB occasions.

Figure 10:
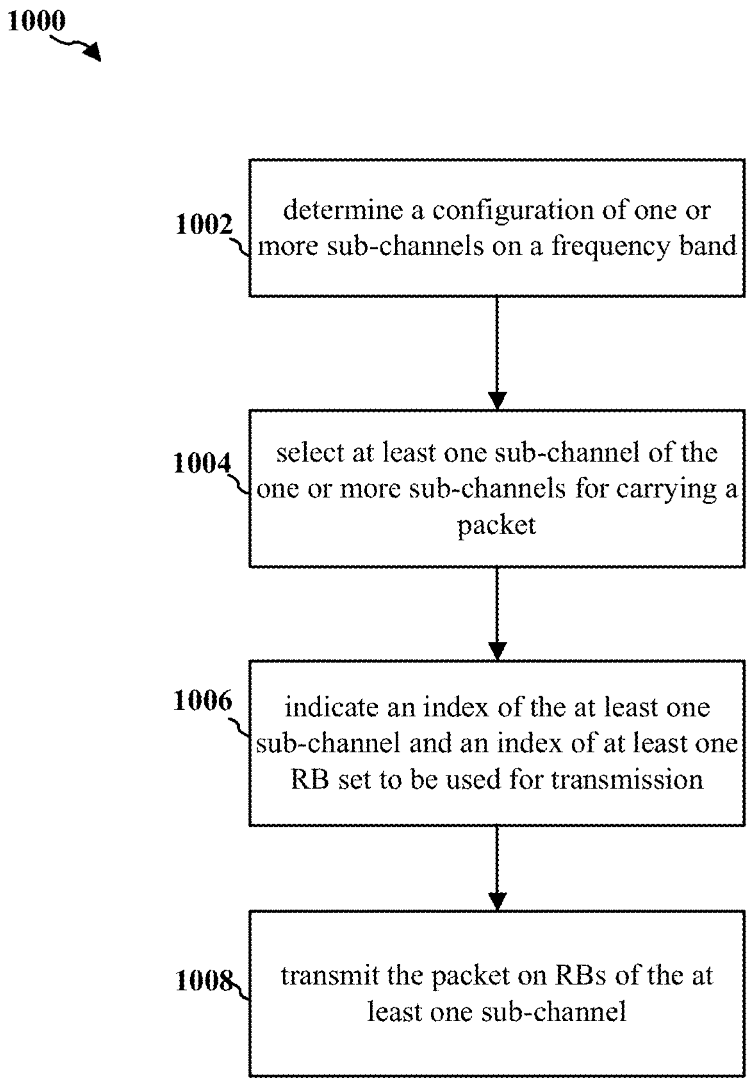
FIG. 10 is a flow chart of a method (process) for transmitting packets through sub-channel(s).

FIG. 10 is a flow chart 1000 of a method (process) for transmitting packets through sub-channel(s). The method may be performed by a UE (e.g., the UE 704, the UE 250). In operation 1002, the UE determines a configuration of one or more sub-channels on a frequency band. Each sub-channel includes one or more interlaces mapped to resource blocks (RBs) within the frequency band. In operation 1004, the UE selects at least one sub-channel of the one or more sub-channels for carrying a packet. In operation 1006, the UE indicates an index of the at least one sub-channel and an index of at least one RB set to be used for transmission. In operation 1008, the UE transmits the packet on RBs of the at least one sub-channel.

In certain configurations, the frequency band contains one or more RB sets, wherein RBs in each RB set are mapped to a same index set of interlaces. In certain configurations, each sub-channel is defined within one RB set and indexed periodically across the one or more RB sets within a resource pool. In certain configurations, a sub-channel with same index is mapped to interlaces with same indices in different RB sets in a resource pool. In certain configurations, the one or more interlaces are mapped to the RBs in a repeating pattern across the frequency band.

In certain configurations, a number of the one or more interlaces mapped to each sub-channel is preconfigured. In certain configurations, the one or more interlaces is one or two interlaces for 15 kHz SCS and one interlace for 30 kHz SCS. In certain configurations, an index of an interlace used for transmitting the packet in different RB sets are the same when more than one RB set are used for transmitting the packet.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

obtaining a number (N) of transmissions of a sidelink synchronization signal block (S-SSB) with repetitions in a frequency domain;

obtaining a gap in the frequency domain between two adjacent transmissions of the N transmissions;

mapping the N S-SSBs into N sets of resources in which two adjacent sets are separated by the gap, wherein the N sets of resources overlap in time domain; and performing the N transmissions of the S-SSB using the N sets of resources.

2. The method of claim 1, wherein at least one of the number (N) and the gap is preconfigured at the UE per resource block (RB) set.

3. The method of claim 1, wherein the gap is between a lowest subcarrier of a Physical Sidelink Broadcast Channel (PSBCH) in the upper S-SSB and a highest subcarrier of the PSBCH in the lower S-SSB of any two adjacent S-SSB transmissions of the N S-SSB transmissions.

4. The method of claim 1, wherein an occupied channel bandwidth from a lowest subcarrier of the N sets of resources to a highest subcarrier of the N sets of resources occupies at least a threshold portion of a bandwidth of a frequency band utilized by the UE.

5. The method of claim 4, wherein the frequency band is on a sidelink.

6. The method of claim 4, wherein the bandwidth of the frequency band is 20 MHz and a subcarrier spacing of the frequency band is 15 or 30 or 60 KHz, wherein the number (N) is in a range from 2 to 9 and the gap is in a range from 0 to 84 physical resource blocks (PRBs).

7. The method of claim 1, wherein an occupied channel bandwidth from a lowest subcarrier of the N sets of resources to a highest subcarrier of the N sets of resources occupies at least a threshold bandwidth of a frequency band utilized by the UE.

8. The method of claim 7, wherein N is 1 and the threshold bandwidth is 2 MHz.

9. The method of claim 1, wherein the S-SSB has a number of corresponding additional candidate S-SSB occasions in different time slots with a pre-configured gap between any two adjacent candidate S-SSB occasions.

10. The method of claim 1, further comprising indicating a capability of the UE for performing the N transmissions of the S-SSB with repetitions in the frequency domain.

11. An apparatus for wireless communication, the apparatus being a user equipment (UE), comprising:

a memory; and at least one processor coupled to the memory and configured to:

obtain a number (N) of transmissions of a sidelink synchronization signal block (S-SSB) with repetitions in a frequency domain;

obtain a gap in the frequency domain between two adjacent transmissions of the N transmissions;

map the N S-SSBs into N sets of resources in which two adjacent sets are separated by the gap, wherein the N sets of resources overlap in time domain; and perform the N transmissions of the S-SSB using the N sets of resources.

* * * * *